US012586222B2

(12) United States Patent
Kuwabara et al.

(10) Patent No.: US 12,586,222 B2
(45) Date of Patent: Mar. 24, 2026

(54) SHAPE-DATA ACQUISITION APPARATUS

(71) Applicants: Hiroaki Kuwabara, Kanagawa (JP);
Shu Takahashi, Kanagawa (JP)

(72) Inventors: Hiroaki Kuwabara, Kanagawa (JP);
Shu Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 101 days.

(21) Appl. No.: 18/133,001

(22) Filed: Apr. 11, 2023

(65) Prior Publication Data

US 2023/0334681 A1     Oct. 19, 2023

(30) Foreign Application Priority Data

Apr. 13, 2022   (JP) ................................. 2022-066160
Jan. 27, 2023   (JP) ................................. 2023-010954

(51) Int. Cl.
G06T 7/514          (2017.01)
G01B 11/25          (2006.01)
(Continued)

(52) U.S. Cl.
CPC .......... G06T 7/514 (2017.01); G01B 11/2518
(2013.01); G02B 26/105 (2013.01); G06T 7/60
(2013.01)

(58) Field of Classification Search
CPC ....... G06T 7/514; G06T 7/60; G01B 11/2518;
G01B 11/2522; G01B 11/254; G02B
26/105
See application file for complete search history.

(56) References Cited

U.S. PATENT DOCUMENTS 4,564,295 A * 1/1986 Halioua ............... G01B 11/254
250/237 G
4,988,886 A * 1/1991 Palum .................. G01B 11/026
356/3.01
(Continued)

FOREIGN PATENT DOCUMENTS

JP       2002-267429       9/2002
JP       2003-042734       2/2003
(Continued)

OTHER PUBLICATIONS

Sine Patterns LLC, "The Sine Patterns Catalogue", Mar. 26, 2013
(see appended page for date and online location) (Year: 2013).*

*Primary Examiner* — Michael P LaPage
*Assistant Examiner* — Joshua M Carlson
(74) *Attorney, Agent, or Firm* — XSENSUS LLP

(57) ABSTRACT

A shape-data acquisition apparatus obtains shape data of a work surface and includes an illuminator, a transmissive optical element, and an imager. The illuminator has a luminance distribution of a first cycle to irradiate the work surface. The transmissive optical element faces specular reflected light reflected by the work surface and has a transmittance distribution of a second cycle. The imager receives the specular reflected light to capture the work surface. The cyclic directions of the first cycle and the second cycle folded at a mirror image position on the work surface are parallel to each other. A relation of $b = a \times f2/f1$ is satisfied when a is a distance between the illuminator and the work surface, b is a distance between the work surface and the transmissive optical element, f1 is the first cycle, and f2 is the second cycle.

18 Claims, 6 Drawing Sheets

(51) Int. Cl.
 *G02B 26/10*  (2006.01)
 *G06T 7/60*  (2017.01)

(56)  References Cited

U.S. PATENT DOCUMENTS

| 6,084,712 | A | * | 7/2000 | Harding | G01B 11/254 |
| | | | | | 359/619 |
| 2002/0159075 | A1 | | 10/2002 | Sakita | |
| 2016/0048969 | A1 | * | 2/2016 | Zhao | G06T 7/586 |
| | | | | | 348/136 |
| 2018/0106599 | A1 | | 4/2018 | Takahashi | |
| 2018/0373171 | A1 | * | 12/2018 | Hugers | G03F 9/7026 |
| 2019/0226836 | A1 | * | 7/2019 | Rudd | G01B 11/2504 |
| 2019/0323831 | A1 | * | 10/2019 | Natori | H04N 13/271 |
| 2020/0072597 | A1 | * | 3/2020 | Zalevsky | A61B 5/024 |
| 2021/0254964 | A1 | * | 8/2021 | Taniguchi | H01J 37/20 |

FOREIGN PATENT DOCUMENTS

| JP | 2003-057191 | 2/2003 |
| JP | 2003-097928 | 4/2003 |
| JP | 2003-121129 | 4/2003 |
| JP | 2003-322516 | 11/2003 |
| JP | 2003-329425 | 11/2003 |
| JP | 2004-108829 | 4/2004 |
| JP | 2019-002762 | 1/2019 |

* cited by examiner

SHAPE-DATA ACQUISITION APPARATUS

CROSS-REFERENCE TO RELATED APPLICATIONS

This patent application is based on and claims priority pursuant to 35 U.S.C. § 119(a) to Japanese Patent Application No. 2022-066160, filed on Apr. 13, 2022, and 2023-010954, filed on Jan. 27, 2023, in the Japan Patent Office, the entire disclosure of which is hereby incorporated by reference herein.

BACKGROUND

Technical Field

Embodiments of the present disclosure relate to a shape-data acquisition apparatus to obtain shape data of a work surface of an object having a shape such as a flat plate shape, a cylindrical shape, or a columnar shape.

Related Art

A technology is known that obtains shape data of a surface of an object as a surface to be inspected. The above-described technology projects stripe-shaped light, for the purpose of optically inspecting a relatively wide area of a surface of an object to be inspected such as a work surface of a workpiece, by a component having a cyclic non-transmissive portions and captures an image of the object to be inspected through the component to obtain surface data of the object to be inspected.

SUMMARY

In an embodiment of the present disclosure, a shape-data acquisition apparatus obtains shape data of a work surface of an object to be inspected and includes an illuminator, a transmissive optical element, and an imager. The illuminator has a luminance distribution of a first cycle in a cyclic direction to irradiate the work surface with illumination light at an incident angle to the work surface. The transmissive optical element faces specular reflected light of the illumination light reflected by the work surface and has a transmittance distribution of a second cycle in a cyclic direction. The imager is disposed at a position to receive the specular reflected light transmitted through the transmissive optical element to capture the work surface. The cyclic direction of the first cycle of the illuminator and the cyclic direction of the second cycle of the transmissive optical element folded at a mirror image position on the work surface are parallel to each other. A relation of $b = a \times f2/f1$ is satisfied when a is a distance between the illuminator and the work surface in an optical-axis direction, b is a distance between the work surface and the transmissive optical element in the optical-axis direction, f1 is the first cycle of the illuminator, and f2 is the second cycle of the transmissive optical element.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figures 1A, 1B:
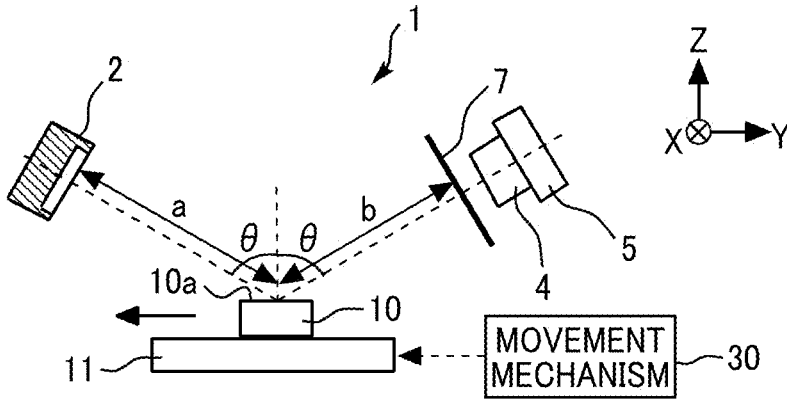
FIGS. 1A and 1B are diagrams illustrating a configuration of a shape-data acquisition apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail with reference to the drawings below. Note that like reference numerals are assigned to like or equivalent components and a description of those components may be simplified or omitted.

First Embodiment

First, an overall configuration and operation of a shape-data acquisition apparatus 1 is described with reference to FIGS. 1A and 1B.

With reference to FIGS. 1A and 1B, the shape-data acquisition apparatus 1 serves as an inspection device for obtaining shape data of a work surface 10a of a workpiece 10 as an object to be inspected. Specifically, the shape-data acquisition apparatus 1 measures and inspects the shape of the work surface 10a of the workpiece 10, such as the inclination, the height, and the height of irregularities of the work surface 10a, set on a translation stage 11 movable in a direction indicated by arrow in FIG. 1B (−Y direction). Thus, the shape-data acquisition apparatus 1 obtains the measurement result as data.

As illustrated in FIGS. 1A and 1B, the shape-data acquisition apparatus 1 according to the first embodiment of the present disclosure includes, for example, a pattern illuminator 2 as an illuminator, a multi-slit 7 as a transmissive optical element, a line-sensor camera 5 and a lens 4 that collectively serve as an imager, the translation stage 11 on which the workpiece 10 is placed, a scanning mechanism 20 as a scanner, an image processor 21 as an image processor, and a monitor 22 to display, for example, measurement results.

The pattern illuminator 2 functions as an illuminator to irradiate the work surface 10a of the workpiece 10 with illumination light at a predetermined incident angle θ, which is defined not to include 0° work surface. The pattern illuminator 2 has a luminance distribution of a cycle f1 (see FIG. 1A) in a predetermined cyclic direction illustrated as X direction in FIGS. 1A and 1B. Specifically, the pattern illuminator 2 includes light-emitting portions and non light-emitting portions alternately arranged at equal widths.

The multi-slit 7 is a transmissive optical element having a transmittance distribution of a cycle f2 (see FIG. 1A) in the predetermined cyclic direction, the X direction. The multi-slit 7 is disposed to face specular reflected light of the illumination light reflected by the work surface 10a to receive the specular reflected light. Specifically, the multi-slit 7 includes opening portions, each of which has a width half the cycle 2. In other words, the opening portions having a transmittance of 100% and the non-opening portions having a transmittance of 0% are alternately arranged at equal widths on the multi-slit 7.

The line-sensor camera 5 and the lens 4 collectively function as the imager to capture an image of the work surface 10a. The line-sensor camera 5 and the lens 4 are disposed to receive the specular reflected light, which is the specular reflected light reflected by the work surface 10a, transmitted through the multi-slit 7.

As described above, the illumination light irradiated from the pattern illuminator 2 is incident on the work surface 10a. After the specular reflected light reflected by the work surface 10a has passed through the multi-slit 7, the specular reflected light is incident on the line-sensor camera 5 via the lens 4.

In other words, the pattern illuminator 2, the line-sensor camera 5, and the lens 4 collectively serve as an obliquely incident specular optical system having the incident angle θ for capturing the specular reflected light from the work surface 10a. The multi-slit 7 is disposed between the workpiece 10 and the line-sensor camera 5 (and the lens 4).

In the shape-data acquisition apparatus 1 according to the first embodiment, a cyclic direction of the cycle f1 of the pattern illuminator 2 and a cyclic direction of the cycle f2 of the multi-slit 7 folded at a mirror-image position on the work surface 10a are parallel to each other.

Specifically, the cyclic direction of the cycle f1 of the luminance distribution of the pattern illuminator 2 and the cyclic direction of the cycle f2 of the luminance distribution of the multi-slit 7 are both parallel to the X direction, which is a direction orthogonal to an incident plane of the above-described obliquely incident specular optical system and a direction in which elements of the line-sensor camera 5 are arranged. However, the cyclic direction of the cycle f1 and the cyclic direction of the cycle f2 are parallel to each other when the cyclic direction of the cycle f1 and the cyclic direction of the cycle 12 are folded at a position of a vertical broken line orthogonal to the incident plane at the mirror-image position of the work surface 10a at which the incident angle θ and the reflection angle θ are divided in FIG. 1B.

Further, with reference to FIGS. 1A and 1B, when the distance between the pattern illuminator 2 and the work surface 10a in an optical-axis direction is a and the distance between the work surface 10a and the multi-slit 7 in the optical-axis direction is b, the shape-data acquisition apparatus 1 according to the first embodiment satisfies Formula 1 of b=a×f2/f1.

Accordingly, a cyclic pattern of light and shade as a striped pattern can be obtained as an image captured by the line-sensor camera 5. The above-described cyclic pattern of light and shade changes in accordance with the inclination of the work surface 10a in the X direction. For this reason, the cyclic pattern of light and shade can be observed as an image including data on the surface shape of the work surface 10a. The above-described principle will be described in detail below with reference to FIGS. 2A and 2B.

In the first embodiment, the above-described distance a and the distance b are uniquely determined. For this reason, the line-sensor camera 5 is employed as the imager. However, some error may be allowed in the above-described Formula 1. Accordingly, an area camera may be employed as the imager.

In the first embodiment, the multi-slit 7 in which the opening portions having the transmittance of 100% and the non-opening portions having the transmittance of 0% are alternately arranged at equal widths is employed as the transmissive optical element to obtain the cyclic pattern of light and shade as a captured image. However, the transmissive optical element is not limited to the above-described transmissive optical element including the opening portions having the transmittance of 100% and the non-opening portions having the transmittance of 0%. Accordingly, any transmissive optical element may be employed as long as the transmissive optical element has the transmittance distribution of the cycle f2.

As described above, the shape-data acquisition apparatus 1 according to the first embodiment can obtain the cyclic pattern of light and shade in a captured image. However, the illuminance itself is substantially uniform on the work surface 10a and the cyclic pattern of light and shade is not projected onto the work surface 10a. Accordingly, the shape-data acquisition apparatus 1 is different from a shape-data acquisition apparatus that employs a so-called pattern projection method.

Further, unlike a shape-data acquisition apparatus that employs a stripe-shaped coaxial illumination, the shape-data acquisition apparatus 1 according to the first embodiment obliquely irradiates the work surface 10a with the illumination light. For this reason, even if the workpiece 10 is a transparent object, the shape of the work surface 10a can be observed. Further, the work surface 10a can be directly irradiated with the illumination light. Accordingly, the illuminance on the work surface 10a can be gained. In particular, the shape-data acquisition apparatus 1 according to the first embodiment can efficiently and accurately obtain the shape data of the work surface 10a when the work surface 10a of the workpiece 10 is glossy.

In the first embodiment, at least one of the luminance distribution of the pattern illuminator 2 and the transmittance distribution of the multi-slit 7 may have a sine wave shape.

Specifically, in the first embodiment, both the luminance distribution of the pattern illuminator 2 and the transmittance distribution of the multi-slit 7 have a rectangular shape with a duty cycle of 1:1, i.e., Ronchi ruling. However, at least one of the luminance distribution of the pattern illuminator 2 and the transmittance distribution of the multi-slit 7 may have the sine wave shape. For example, a transmissive optical element that has a transmittance distribution of a sine wave of the cycle f2 can be employed.

In such a case, the visibility of the cyclic pattern of light and shade, i.e., a striped pattern, as a captured image is lowered. However, high-order components of the striped pattern are reduced. Accordingly, the shape-data acquisition apparatus 1 can reduce noise components generated when a so-called fringe-scanning method is employed. Note that the fringe-scanning method, which obtains the shape data of the work surface 10a employed in the shape-data acquisition apparatus 1 according to the present embodiment, will be described in detail below.

Figure 2A:
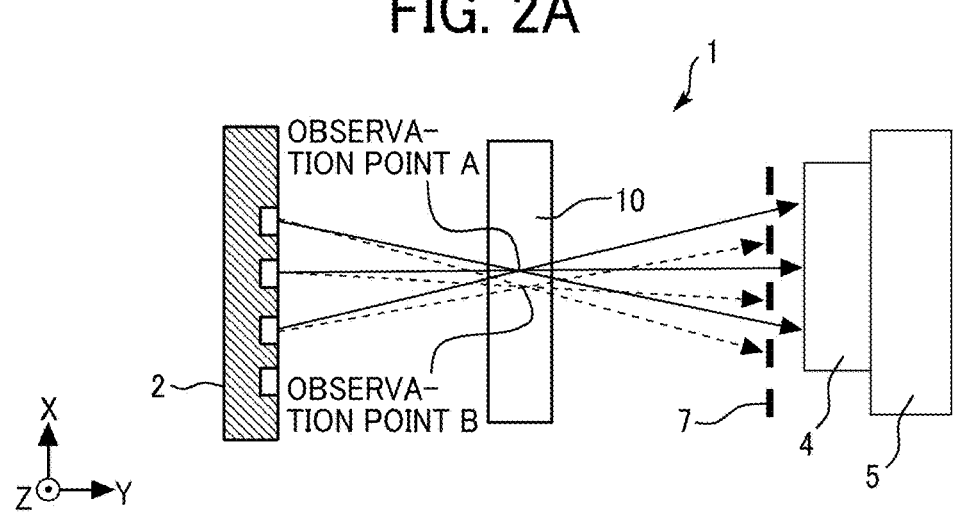
FIG. 2A is a diagram illustrating a principle in which a cyclic pattern of light and shade is generated, according to an embodiment of the present disclosure.
Figure 2B:
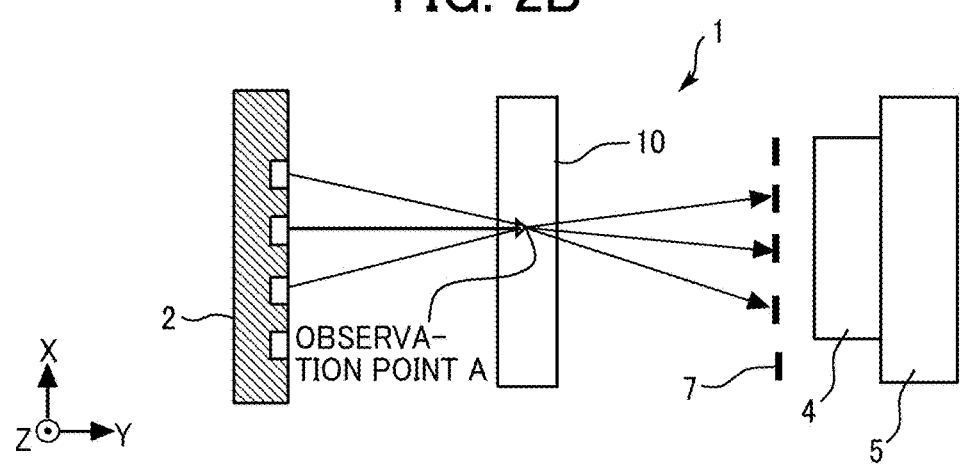
FIG. 2B is a diagram illustrating a principle in which a cyclic pattern of light and shade changes depending on an inclination of a workpiece, according to an embodiment of the present disclosure.
Figure 3:
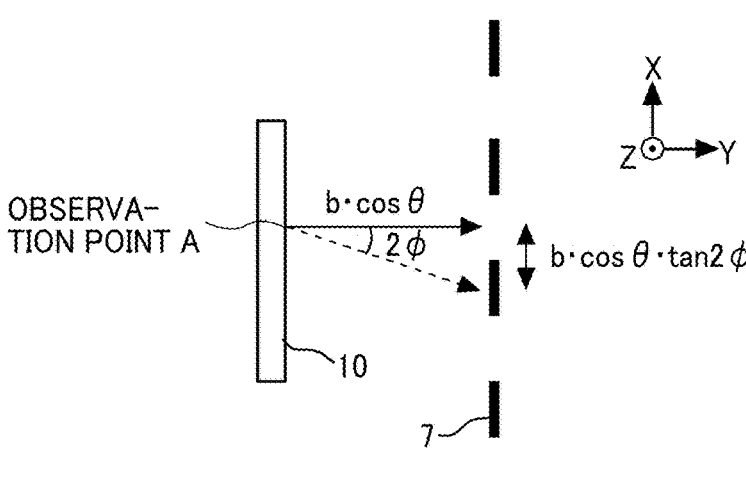
FIG. 3 is a diagram supplementing an explanation of the principles illustrated in FIGS. 2A and 2B, according to an embodiment of the present disclosure.

With reference to FIGS. 2A, 2B, and 3, a description is given of a principle in which a cyclic pattern of light and shade as a striped pattern is generated in a captured image and a principle in which the cyclic pattern of light and shade changes depending on the inclination of the workpiece 10 in the shape-data acquisition apparatus 1 according to the first embodiment.

As described above, the shape-data acquisition apparatus 1 according to the first embodiment satisfies the Formula 1 of b=a×f2/f1. Accordingly, as illustrated in FIG. 2A, at an observation point A on the workpiece 10, the specular reflected light of the pattern illuminator 2 passes through the opening portions of the multi-slit 7 and is brightly reflected on a captured image. On the other hand, at an observation point B on the workpiece 10, the specular reflected light of the pattern illuminator 2 is all blocked by the non-opening portions of the multi-slit 7. Accordingly, the specular reflected light is dimly reflected on the captured image. The above-described description is the principle in which the cyclic pattern of light and shade is generated in a captured image. Note that a cycle of the cyclic pattern of light and shade as a striped pattern in the X direction is f2×a/(a+b).

A striped pattern is generated in a captured image by the above-described principle. Accordingly, the striped pattern does not look unclear even when the focal point is not set onto the workpiece 10. In a method in which reflected light of simple patterned panel illumination is employed to capture an image, a trade-off may occur between the sensitivity of the shape-data acquisition apparatus 1 to the surface inclination of the workpiece 10, which is the inclination of the work surface 10a, and the spatial resolution of the shape-data acquisition apparatus 1. However, as a result of the above-described principle, such a trade-off is less likely to occur.

As illustrated in FIG. 3, when the workpiece 10 has an inclination of angle φ as a surface inclination in the X direction at the observation point A, the reflection direction changes by 2φ. Accordingly, a position at which the specular reflected light of the pattern illuminator 2 is incident on the multi-slit 7 in the cyclic direction, i.e., the X direction, changes by b·cos θ·tan 2φ. For this reason, as illustrated in FIG. 2B, when a state in which the reflected light passes through the opening portions of the multi-slit 7 changes to a state in which the reflected light is shielded by the non-opening portions of the multi-slit 7, phase modulation may occur in the striped pattern on the captured image. Accordingly, a change in the striped pattern in accordance with the inclination of the work surface 10a can be captured as a captured image.

Further, the sensitivity of the shape-data acquisition apparatus 1 to the inclination of the workpiece 10 is proportional to b and cos θ and inversely proportional to the cycle f2. Accordingly, the sensitivity of the shape-data acquisition apparatus 1 to the inclination of the work surface 10a can be controlled by the above-described parameters. When the sensitivity of the shape-data acquisition apparatus 1 is excessive and the phase modulation amount of a striped pattern is large, the shape of the striped pattern may be crushed and the quantitative measurement of the surface shape of the work surface 10a by the fringe-scanning method may not be performed. In a shape-data acquisition apparatus that employs the stripe-shaped coaxial illumination, the ratio b/f2 may be limited by the numerical aperture (NA) of a lens. For this reason, excessive sensitivity of the shape-data acquisition apparatus may not be prevented. However, according to the fringe-scanning method employed by the shape-data acquisition apparatus 1 according to the present embodiment, the sensitivity of the shape-data acquisition apparatus 1 can be freely set by cos θ.

The relation between the above-described shape-data acquisition apparatus in the art and the shape-data acquisition apparatus 1 according to the first embodiment is further described in a supplementary manner below.

The shape-data acquisition apparatus 1 according to the first embodiment of the present disclosure irradiates light from the pattern illuminator 2 having the luminance distribution of the cycle f1 onto the work surface 10a and causes the specular reflected light to pass through the multi-slit 7 having the transmittance distribution of the cycle f2 to form an image on the line-sensor camera 5 by the lens 4. In the first embodiment, the work surface 10a of the workpiece 10 is a flat surface. Accordingly, an image of the entire work surface 10a is captured while the workpiece 10 is moved in a Y direction using the translation stage 11.

Unlike the pattern projection method based on a principle of trilateration in the art, the shape-data acquisition apparatus 1 according to the first embodiment detects minute inclinations of the work surface 10a by using an optical lever. Thus, the shape-data acquisition apparatus 1 according to the first embodiment has high sensitivity. In addition, a reflection method is known that employs the optical lever to detect an inclination of an object to be inspected. However, in the reflection method, both an image of the workpiece and the illumination pattern are resolved. For this reason, it is preferable to increase the cycle of the pattern illumination at the sacrifice of the sensitivity of a shape-data acquisition apparatus to the surface inclination of the workpiece or to set the focal point on an intermediate point between the pattern illumination and the workpiece at the sacrifice of the resolution in a surface direction of the workpiece. By contrast, in the shape-data acquisition apparatus 1 according to the first embodiment, the striped pattern is generated without resolving the illumination pattern. For this reason, it is sufficient to set the focal point only on the workpiece 10. Accordingly, both the sensitivity and the resolution of the shape-data acquisition apparatus 1 in the surface direction of the workpiece can be enhanced.

In the first embodiment, the above-described image capturing method and the fringe-scanning method for analyzing the phase of the striped pattern are combined and obtained quantitative inclination data is integrated. By so doing, surface height data of the work surface 10a with submicron accuracy can be obtained.

In addition, the shape-data acquisition apparatus 1 according to the first embodiment has a configuration in which the illumination light is obliquely incident on the work surface 10a. For this reason, following advantages are obtained as compared with the shape-data acquisition apparatus in the art having a configuration in which the incident light and the reflected light are coaxial.

1. In the shape-data acquisition apparatus in the art, a ratio of the pattern cycle f2 of a multi-slit to the distance b with respect to the NA of the lens is equal to or smaller than a certain value as expressed in the following formula b×tan (asin(NA))/f2≥0.35 (preferably =1.1). When this formula is not satisfied, noise components are highly likely to be generated. The ratio b/f2 in the above-described formula is the sensitivity of the shape-data acquisition apparatus to the shape of the work surface. For this reason, the sensitivity of the shape-data acquisition apparatus cannot be lowered below a certain level. Therefore, the shape-data acquisition apparatus in the art may not cope with the work surface having an inclination of large surface irregularities. By contrast, the shape-data acquisition apparatus 1 according to the first embodiment has a configuration in which the illumination light is obliquely incident on the work surface 10a and the sensitivity of the shape-data acquisition apparatus 1 to the shape of the work surface 10a is b/f2×cos θ. Accordingly, the shape-data acquisition apparatus 1 can cope with a work surface having a wide range of inclined shapes by controlling the incident angle θ. In the case of the shape-data acquisition apparatus in the art, the incident light and the reflected light are both vertically incident on the work surface and therefore coaxial with each other. Accordingly, the incident angle θ is equal to 0°.

2. In a case in which an object to be inspected is a transparent workpiece, in the shape-data acquisition apparatus in the art, noise is generated in the shape data of the work surface due to light returning from the inside of the workpiece. However, in the case of the shape-data acquisition apparatus 1 according to the first embodiment, the amount of light returning from the inside of the workpiece 10 is relatively small because the light is obliquely incident to the work surface 10a. Accordingly, the noise in the shape data of the work surface 10a is reduced.

3. It is sufficient for the transmissive optical element. i.e., the multi-slit 7, according to the first embodiment to have a size large enough to cover the pupil diameter of the lens 4. Accordingly, the scanning mechanism 20 that scans the transmissive optical element, i.e., the multi-slit 7, to perform the fringe-scanning method can be reduced in size and weight. For example, when the lens 4 is a non-telecentric lens, it is sufficient for the size of the multi-slit 7 to be several centimeters square. Accordingly, the scanning mechanism 20 can be made compact and small-sized, and lightweight. Further, the distance b is increased while increasing the cycle f2 with respect to the cycle f1 to decrease the distance a to increase the illuminance. By so doing, the scanning mechanism 20 can be disposed at a position sufficiently away from the workpiece 10.

4. In the shape-data acquisition apparatus in the art, the incident light and the reflected light are coaxial with each other. For this reason, using a light guide plate or a half mirror may reduce the amount of light. Accordingly, it may be difficult for the shape-data acquisition apparatus to capture an image by employing a line-sensor camera when the shape of a workpiece is columnar or cylindrical. By contrast, the shape-data acquisition apparatus 1 according to the first embodiment has a configuration in which the illumination light is obliquely incident on the work surface 10a. For this reason, even if the workpiece 10 has a columnar shape or a cylindrical shape, the work surface 10a can be directly illuminated to obtain high illuminance on the work surface 10a. Thus, capturing an image by the line-sensor camera 5 can be satisfactorily performed.

With reference to FIGS. 1A and 1B, the shape-data acquisition apparatus 1 includes the scanning mechanism 20 as the scanner. The scanning mechanism 20 scans at least one of the luminance distribution of the cycle f1 of the pattern illuminator 2 and the transmittance distribution of the cycle f2 of the multi-slit 7 in the cyclic direction, i.e., the X direction.

Specifically, the shape-data acquisition apparatus 1 includes the scanning mechanism that scans the multi-slit 7 in the cyclic direction of the cycle 2. As the scanning mechanism 20, for example, a rack and pinion mechanism can be employed.

The multi-slit 7 is moved in the cyclic direction by the above-described scanning mechanism 20 to generate phase modulation on the striped pattern on a captured image as described above with reference to FIGS. 2A, 2B, and 3.

Note that in the shape-data acquisition apparatus 1 according to the first embodiment, the transmittance distribution of the cycle f2 of the multi-slit 7 is scanned in the cyclic direction. However, the luminance distribution of the cycle f1 of the pattern illuminator 2 may be scanned in the cyclic direction, or both the transmittance distribution of the cycle f2 of the multi-slit 7 and the luminance distribution of the cycle f1 of the pattern illuminator 2 may be scanned in the cyclic direction.

With reference to FIG. 1A, the shape-data acquisition apparatus 1 includes the image processor 21 as an image processor to arithmetically process an image as a digital image of the work surface 10a captured by the line-sensor camera 5.

While the scanning mechanism 20 scans the multi-slit 7, at least one of the surface inclination of the work surface 10a and the surface height of the work surface 10a is calculated by the image processor 21.

Specifically, the shape-data acquisition apparatus 1 obtains a three-dimensional shape of the work surface 10a from a factor of proportionality between the phase modulation amount, which is obtained by the fringe-scanning method based on the result of the arithmetic processing performed by the image processor 21 when scanning is performed by the scanning mechanism 20, and the surface inclination of the work surface 10a. Then, the obtained result is displayed on the monitor 22.

Note that the image processor 21 and the monitor 22 can be integrated as a single unit such as a personal computer.

In the obliquely incident specular optical system of the shape-data acquisition apparatus 1 for performing the fringe-scanning method described above, the cyclic pattern of light and shade on the work surface 10a changes in accordance with the inclination of the work surface 10a. Accordingly, the presence or absence of irregularities on the work surface 10a can be determined. However, the shape of the work surface 10a is not quantitatively measured. However, the shape-data acquisition apparatus 1 according to the first embodiment calculates the phase modulation amount when the cyclic pattern of light and shade changes on the work surface 10a in accordance with an inclination 9 of the work surface 10a using a formula of $2\pi \cdot b \cdot \cos \theta \cdot \tan 2\varphi / f2$ based on the principle described above with reference to FIGS. 2A, 2B, and 3. Accordingly, if the phase modulation amount when the cyclic pattern of light and shade changes on the work surface 10a is quantitatively obtained, the surface inclination φ of the work surface 10a can be quantitatively measured. Thus, the height shape, i.e., the height of the work surface 10a, can be quantitatively calculated from the surface inclination φ. For this reason, the shape-data acquisition apparatus 1 according to the first embodiment includes the scanning mechanism 20 to move the multi-slit 7 between the workpiece 10 and the line-sensor camera 5 in parallel with the cyclic direction of the multi-slit 7 and the image processor 21 to capture multiple images and process the images. Such a configuration as described above allows the shape-data acquisition apparatus 1 to employ the fringe-scanning method and calculate the phase modulation amount when the cyclic pattern of light and shade changes on the work surface 10a. As described above, the shape-data acquisition apparatus 1 according to the first embodiment employs the fringe-scanning method. However, the fringe-scanning method employed by the shape-data acquisition apparatus 1 is different from the fringe-scanning method in the art.

Figure 4:
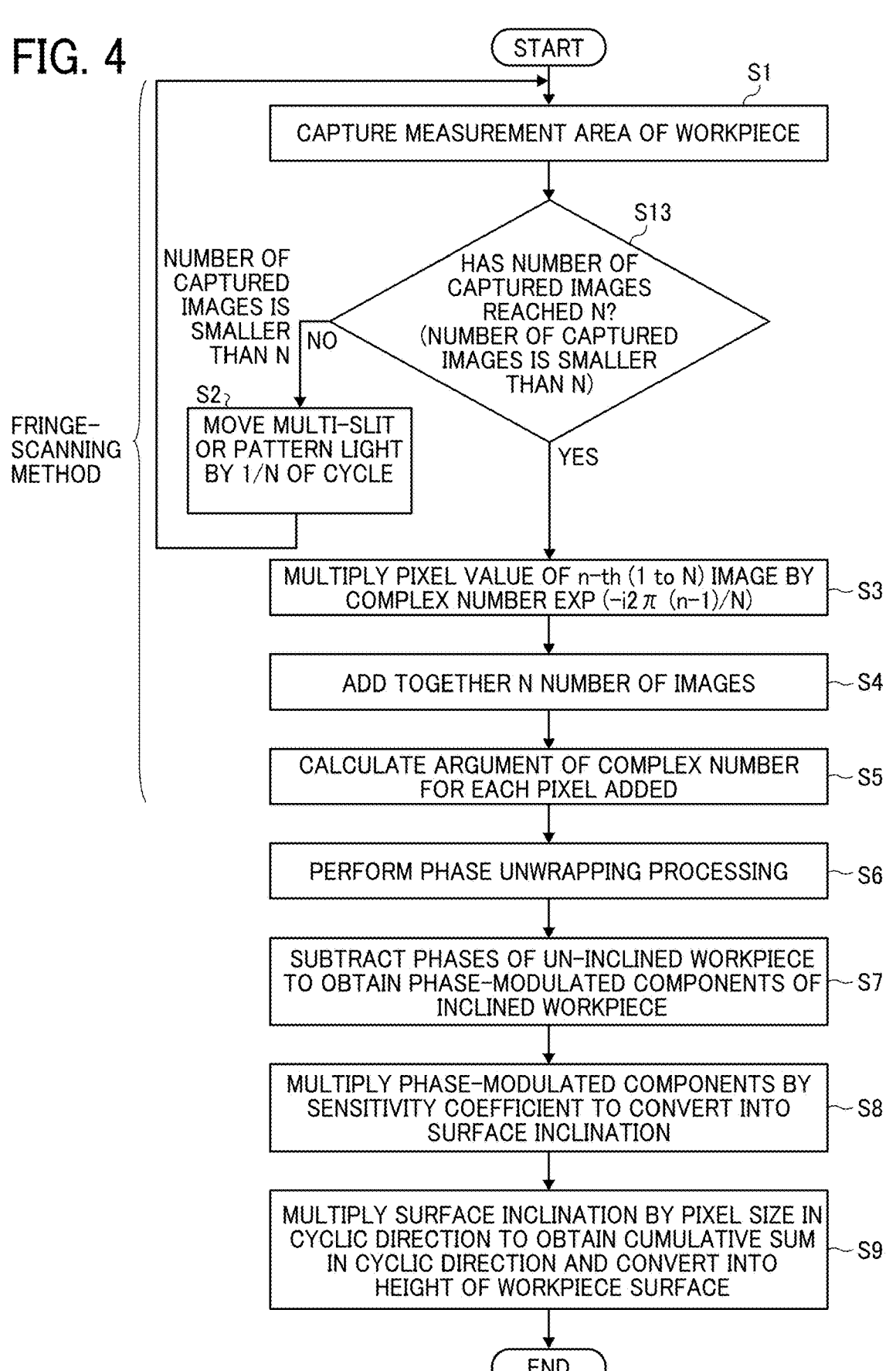
FIG. 4 is a flowchart illustrating control in which the shape-data acquisition apparatus of FIGS. 1A and 1B obtains shape data of a work surface of a workpiece, according to an embodiment of the present disclosure.

The control for obtaining the shape data of the work surface 10a is described with reference to FIG. 4 in the following description.

First, N (N≥3) number of steps of scanning a striped pattern using the scanning mechanism 20 is determined. Then, the multi-slit 7 is shifted by 1/N of the cycle f2 of the multi-slit 7 in the cyclic direction by the scanning mechanism 20 to capture the N number of images (steps S1 and S2).

After the N number of images has been captured, the image processor 21 multiplies each pixel value of a n-th (1 to N) image by a complex number exp(−i2π(n−1)/N) (Step S3). Subsequently, the N number of images are added together for each corresponding one of pixels of the N number of images (step S4). Further, the shape-data acquisition apparatus 1 according to the first embodiment calculates an argument of complex of each one of the pixels of the N number of images added together in step S4. By so doing, the shape-data acquisition apparatus 1 can obtain phases generated by a change of the cyclic pattern of light and shade of the pixels (step S5). The above-described procedures (steps S1, S2, S3, S4 and S5) up to this point are a typical fringe-scanning method to quantitatively calculate phases of a striped pattern from an image including the striped pattern.

After the above-described procedures (steps S1, S2, S3, S4 and S5) have been performed, the phases obtained in step S5 are wrapped by 2π. Accordingly, when the absolute value of the difference between the phases of adjacent pixels is equal to or greater than −π and less than π, phase unwrapping processing is performed such that the difference between the phases of the adjacent pixels is equal to or greater than −π and less than n by adding an appropriate value that is an integer multiple of 2π for each pixel (step S6).

Subsequently, phases or estimated values of phases in a case in which the work surface 10a is not inclined are subtracted from the phases processed in step S6 to obtain a phase modulation component due to the inclination of the work surface 10a (step S7).

The phase modulation component obtained in Step S7 is multiplied by a sensitivity coefficient to be converted into a surface inclination of the work surface 10a in a direction in which the shape-data acquisition apparatus 1 has sensitivity (step S8).

Then, the surface inclination of the work surface 10a calculated in step S8 is multiplied by the size of the pixels in the cyclic direction, i.e., the X direction, to obtain a cumulative sum of the size of the pixels in the cyclic direction. Thus, the product is converted into a surface height of the work surface 10a (step S9). As described above, the shape data of the work surface 10a is obtained. Subsequently, the workpiece 10 is moved in the Y direction on the translation stage 11 provided with the moving mechanism 30, and similar control is repeated until the entire area of the work surface 10a is captured.

Figure 5A:
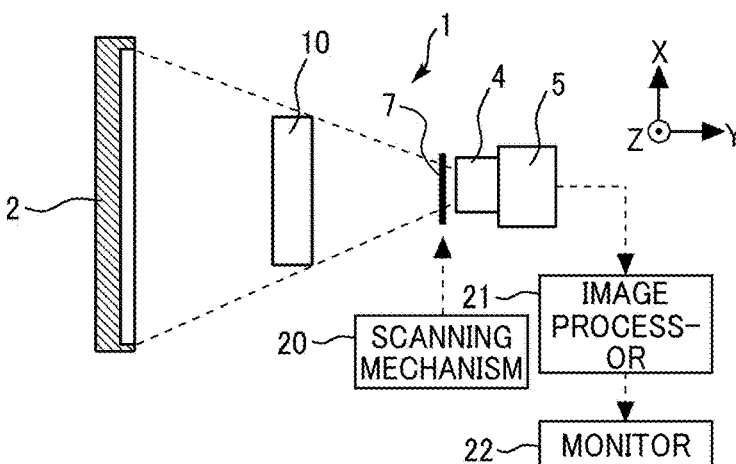
FIGS. 5A and 5B are diagrams illustrating a configuration of a shape-data acquisition apparatus according to a second embodiment of the present disclosure.

Note that, in the first embodiment of the present disclosure, the surface height of the work surface 10a is calculated from the inclination of the work surface 10a in one direction. The shape-data acquisition apparatus 1 has sensitivity in the X direction. Accordingly, the surface height of the work surface 10a is zero (Y=0). Thus, the surface height of the work surface 10a in the one direction, i.e., relative to the Y direction is obtained. For this reason, the above-described configuration may be sufficient in a case in which a profile of a cross section of the shape of the work surface 10a is obtained by, for example, the inspection of the work surface 10a. However, when it is necessary to calculate a two-dimensionally correct height of the work surface 10a in the X and Y directions, image capturing is performed by the shape-data acquisition apparatus 1 having sensitivity both in the X direction and in the Y direction, which is, for example, a configuration illustrated in FIG. 5 to be described below, to synthesize data captured both in the X direction and in the Y direction. Alternatively, an original height at a position at which the surface height of the work surface 10a is zero may be measured separately using a displacement meter and corrected.

As described above, the shape-data acquisition apparatus 1 according to the first embodiment obtains the shape data of the work surface 10a of the workpiece 10 as an object to be inspected, and includes the pattern illuminator 2 having the luminance distribution of the cycle f1 in the predetermined cyclic direction to irradiate the work surface 10a with the illumination light at the predetermined incident angle θ. In addition, the shape-data acquisition apparatus 1 includes the multi-slit 7 as the transmissive optical element facing the specular reflected light of the illumination light reflected by the work surface 10a and having the transmittance distribution of the cycle f2 in the predetermined cyclic direction. Further, the shape-data acquisition apparatus 1 includes the line-sensor camera 5 and the lens 4 as the imager to capture the image of the work surface 10a. The line-sensor camera 5 and the lens 4 are disposed so as to receive the specular reflected light transmitted through the multi-slit 7. The cyclic direction of the cycle f1 and the cyclic direction of the cycle f2 folded at the mirror image position with respect to the work surface 10a are parallel to each other. Further, when the distance between the pattern illuminator 2 and the work surface 10a in the optical-axis direction is a and the distance between the work surface 10a and the multi-slit 7 in the optical-axis direction is b, the Formula 1 of b=a×f1/f1 is satisfied.

Accordingly, even if the workpiece 10 is a transparent object, the shape data of the work surface 10a can be obtained at high speed, high sensitivity, and high resolution. Thus, a measurable area on the work surface 10a can be widened. In other words, even if the workpiece 10 is a transparent object, the shape data of the work surface 10a can be obtained efficiently and accurately.

Second Embodiment

Figure 5B:
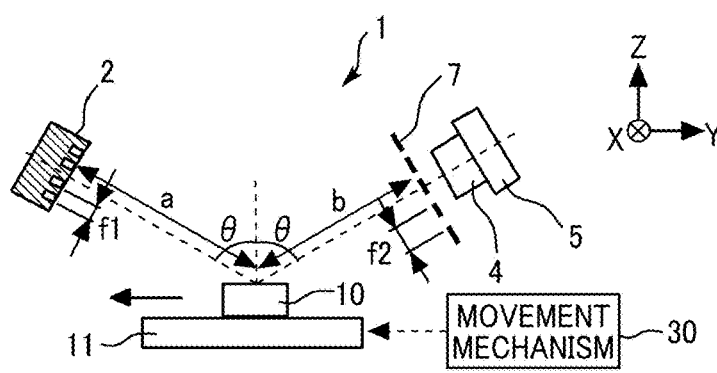

As illustrated in FIG. 5B, the shape-data acquisition apparatus 1 according to a second embodiment has a configuration in which the cyclic direction of the cycle f1 in the pattern illuminator 2 and the cyclic direction of the cycle f2 in the multi-slit 7 are orthogonal to the cyclic direction of the cycle f1 in the pattern illuminator 2 and the cyclic direction of the cycle f2 in the multi-slit 7 illustrated in FIG. 1B.

In other words, the shape-data acquisition apparatus 1 according to the second embodiment has sensitivity to the inclination of the work surface 10a in the Y direction, unlike the shape-data acquisition apparatus 1 according to the first embodiment which has sensitivity to the inclination of the work surface 10a in the X direction.

Specifically, in the shape-data acquisition apparatus 1 according to the second embodiment, the cyclic direction of the cycle f1 in the pattern illuminator 2 and the cyclic direction of the cycle f2 in the multi-slit 7 are rotated by 90° around the optical axis unlike the shape-data acquisition apparatus 1 according to the first embodiment illustrated in FIG. 1B. The scanning mechanism 20 according to the second embodiment scans the multi-slit 7 in the cyclic direction, i.e., the Y direction.

In the above-described configuration of the shape-data acquisition apparatus 1 according to the second embodiment, a spatial cyclic pattern of light and shade as a striped pattern is orthogonal to the direction in which the elements of the line-sensor camera 5 are arranged. As a result, the spatial cyclic pattern of light and shade as the striped pattern is highly unlikely to be recognized on the captured image of the line-sensor camera 5. However, a change in the cyclic pattern of light and shade as a striped pattern corresponding to the phase modulation of the striped pattern occurs on a captured image. Accordingly, a change in the cyclic pattern of light and shade corresponding to the inclination of the work surface 10a in the Y direction is obtained.

However, a change of position at which the specular reflected light is incident on the multi-slit 7 in the cyclic direction due to the inclination of the work surface 10a is not b·cos θ ·tan 2φ as in the first embodiment, but b·tan 2φ in the second embodiment. Accordingly, the degree of freedom in setting the sensitivity of the shape-data acquisition apparatus 1 described with reference to FIGS. 2A, 2B, and 3 may be reduced. For this reason, to solve such a disadvantage as described above, the configuration in which the shape-data acquisition apparatus 1 according to the first embodiment has sensitivity in the X direction can be combined with the configuration in which shape-data acquisition apparatus 1 according to the second embodiment has sensitivity in the Y direction.

Note that, also in the second embodiment, the control described above with reference to FIG. 4 can be performed. However, in such a case, the shape-data acquisition apparatus 1 has sensitivity in the Y direction. For this reason, the sensitivity coefficient multiplied by the phase modulation component in step S8 of FIG. 4 is f2/4π·b. This is because, in the case of the configuration in which the shape-data acquisition apparatus 1 has sensitivity in the X direction, the change in phase of the cyclic pattern of light and shade is 2π·b cos θ·tan 2φ/f2, and tan 2φ≈2φ when the surface inclination of the work surface 10a is small. Accordingly, the sensitivity coefficient is f2/4·π·b cos θ.

As described above, the shape-data acquisition apparatus 1 according to the second embodiment obtains the shape data of the work surface 10a of the workpiece 10 as an object to be inspected, and includes the pattern illuminator 2 as the illuminator having the luminance distribution of the cycle f1 in the predetermined cyclic direction to irradiate the work surface 10a with the illumination light at the predetermined incident angle θ. In addition, the shape-data acquisition apparatus 1 according to the second embodiment includes the multi-slit 7 as the transmissive optical element facing the specular reflected light of the illumination light reflected by the work surface 10a and having the transmittance distribution of the cycle f2 in the predetermined cyclic direction. Further, the shape-data acquisition apparatus 1 according to the second embodiment includes the line-sensor camera 5 and the lens 4 as the imager to capture the image of the work surface 10a. The line-sensor camera 5 and the lens 4 are disposed so as to receive the specular reflected light transmitted through the multi-slit 7. The cyclic direction of the cycle f1 and the cyclic direction of the cycle f2 folded at the mirror image position with respect to the work surface 10a are parallel to each other. Further, when the distance between the pattern illuminator 2 and the work surface 10a in the optical-axis direction is a and the distance between the work surface 10a and the multi-slit 7 in the optical-axis direction is b, the Formula 1 of b=a×f2/f1 is satisfied.

Accordingly, even if the workpiece 10 is a transparent object, the shape data of the work surface 10a can be obtained at high speed, high sensitivity, and high resolution. Thus, a measurable area on the work surface 10a can be widened. In other words, even if the workpiece 10 is a transparent object, the shape data of the work surface 10a can be obtained efficiently and accurately.

In addition, in the shape-data acquisition apparatus 1 according to the second embodiment, the size of the scanning mechanism 20 can be compact as described above, and noise included in the calculated shape data can be reduced.

Third Embodiment

Figure 6A:
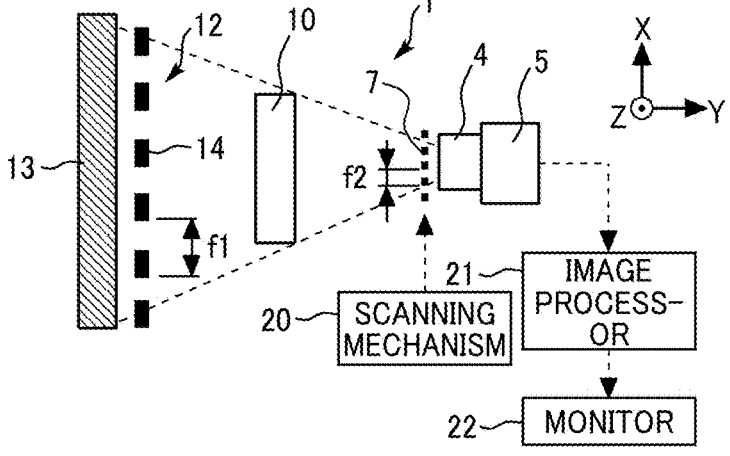
FIGS. 6A and 6B are diagrams illustrating a configuration of a shape-data acquisition apparatus according to a third embodiment of the present disclosure.
Figure 6B:
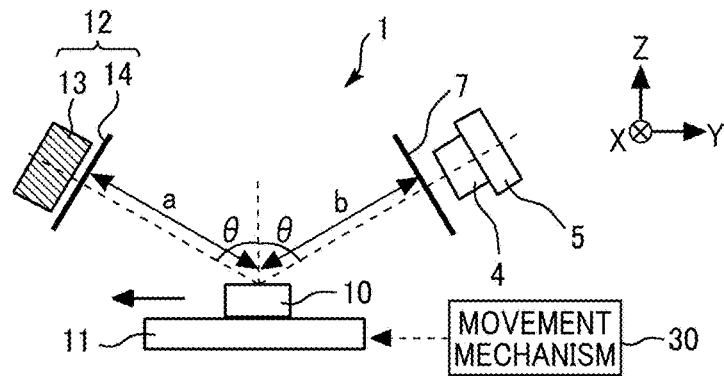

As illustrated in FIGS. 6A and 6B, the shape-data acquisition apparatus 1 according to a third embodiment is different from the shape-data acquisition apparatus 1 according to the first embodiment in that the shape-data acquisition apparatus 1 according to the third embodiment includes an illuminator 12 as an illuminator including a bar illuminator 13 as an illumination unit and an illumination multi-slit 14 as a second transmissive optical element.

In the third embodiment, the bar illuminator 13 is a typical illumination unit having a uniform luminance distribution.

The illumination multi-slit 14 as the second transmissive optical element has the transmittance distribution of the cycle f1 in the cyclic direction, i.e., the X direction, and is disposed between the bar illuminator 13 and the work surface 10a such that the distance between the illumination multi-slit 14 and the work surface 10a in the optical-axis direction is a (see the Formula 1). Specifically, the illumination multi-slit 14 as the second transmissive optical element according to the third embodiment includes opening portions having a transmittance of 100% and non-opening portions having a transmittance of 0% alternately arranged at equal widths.

The illuminator 12 that includes the bar illuminator 13 and the illumination multi-slit 14 serves as an illuminator having the luminance distribution of the cycle f1 in the cyclic direction, i.e., the X direction. In such a case, the opening portions of the illumination multi-slit 14 function as virtual pattern light sources.

Note that the control described above with reference to FIG. 4 can be performed also in the shape-data acquisition apparatus 1 according to the third embodiment.

As described above, the shape-data acquisition apparatus 1 according to the third embodiment obtains the shape data of the work surface 10a of the workpiece 10 as the object to be inspected, and includes the illuminator 12 as the illuminator that has the luminance distribution of the cycle f1 in the predetermined cyclic direction to irradiate the work surface 10a with the illumination light at the predetermined incident angle θ. In addition, the shape-data acquisition apparatus 1 according to the third embodiment includes the multi-slit 7 as the transmissive optical element facing the specular reflected light of the illumination light reflected by the work surface 10a and having the transmittance distribution of the cycle f2 in the predetermined cyclic direction. Further, the shape-data acquisition apparatus 1 according to the third embodiment includes the line-sensor camera 5 and the lens 4 as the imager to capture the image of the work surface 10a. The line-sensor camera 5 and the lens 4 are disposed so as to receive the specular reflected light transmitted through the multi-slit 7. The cyclic direction of the cycle f1 and the cyclic direction of the cycle f2 folded at the mirror image position with respect to the work surface 10a are parallel to each other. Further, when a distance between the illumination multi-slit 14 as the second transmissive optical element of the illuminator 12 and the work surface 10a in the optical-axis direction is a and the distance between the work surface 10a and the multi-slit 7 in the optical-axis direction is b, the Formula 1 of b=a×f2/f1 is satisfied.

Accordingly, even if the workpiece 10 is a transparent object, the shape data of the work surface 10a can be obtained at high speed, high sensitivity, and high resolution. Thus, a measurable area on the work surface 10a can be widened. In other words, even if the workpiece 10 is a transparent object, the shape data of the work surface 10a can be obtained efficiently and accurately.

In addition, the shape-data acquisition apparatus 1 according to the third embodiment can employ a general-purpose uniform illuminator. Accordingly, the cost of the shape-data acquisition apparatus 1 can be reduced.

Note that, in the third embodiment, a transmissive optical element that has a transmittance distribution in a sine wave shape may be employed as the second transmission-type optical element.

Fourth Embodiment

Figure 7A:
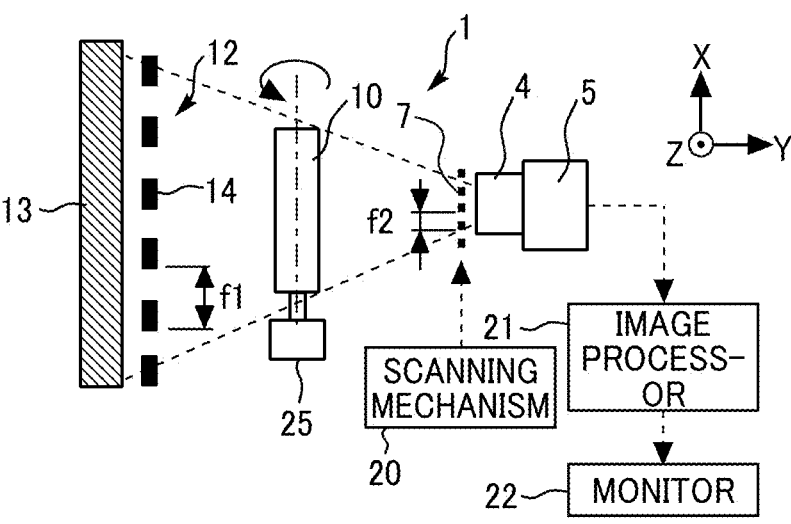
FIGS. 7A and 7B are diagrams illustrating a configuration of a shape-data acquisition apparatus according to a fourth embodiment of the present disclosure.
Figure 7B:
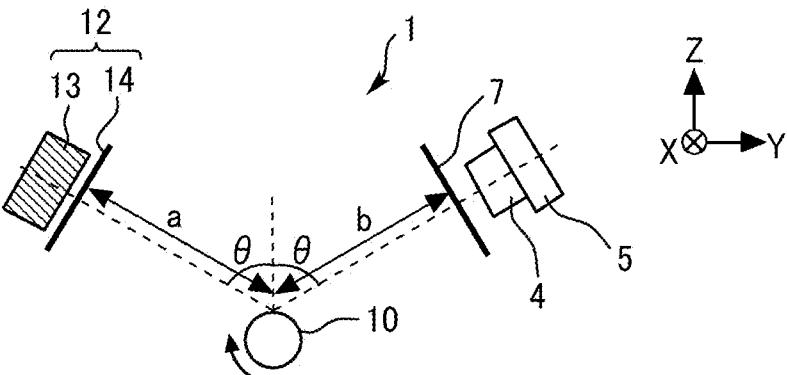

As illustrated in FIGS. 7A and 7B, the shape-data acquisition apparatus 1 according to a fourth embodiment obtains the shape data of the work surface 10a as a peripheral surface of the workpiece 10 having a cylindrical or columnar shape as an object to be inspected.

The shape-data acquisition apparatus 1 according to the fourth embodiment is different from the shape-data acquisition apparatus 1 according to the third embodiment in that the shape-data acquisition apparatus 1 according to the fourth embodiment includes a rotation motor 25 as a rotation mechanism to rotate the workpiece 10 about the central axis of the workpiece 10.

In the shape-data acquisition apparatus 1 according to the fourth embodiment, while the workpiece 10 is rotated at least three times by the rotation motor 25, the peripheral surface of the workpiece 10 is continuously captured by the line-sensor camera 5 and the lens 4 as the imager while the scanning mechanism 20 performs scanning of the multi-slit 7 at a constant speed.

In a typical fringe-scanning method, the N number of images are captured when the striped pattern is scanned by each 1/N cycle. However, as described above, in the fringe-scanning method according to the fourth embodiment, the striped pattern is continuously scanned for one cycle while the workpiece 10 is continuously scanned and captured for the N number of rotations of the workpiece 10. Accordingly, the entire time for capturing the N number of images is shortened. Further, in the shape-data acquisition apparatus 1 according to the fourth embodiment, the sizes of components to be moved when the striped pattern is scanned are reduced.

Figure 8:
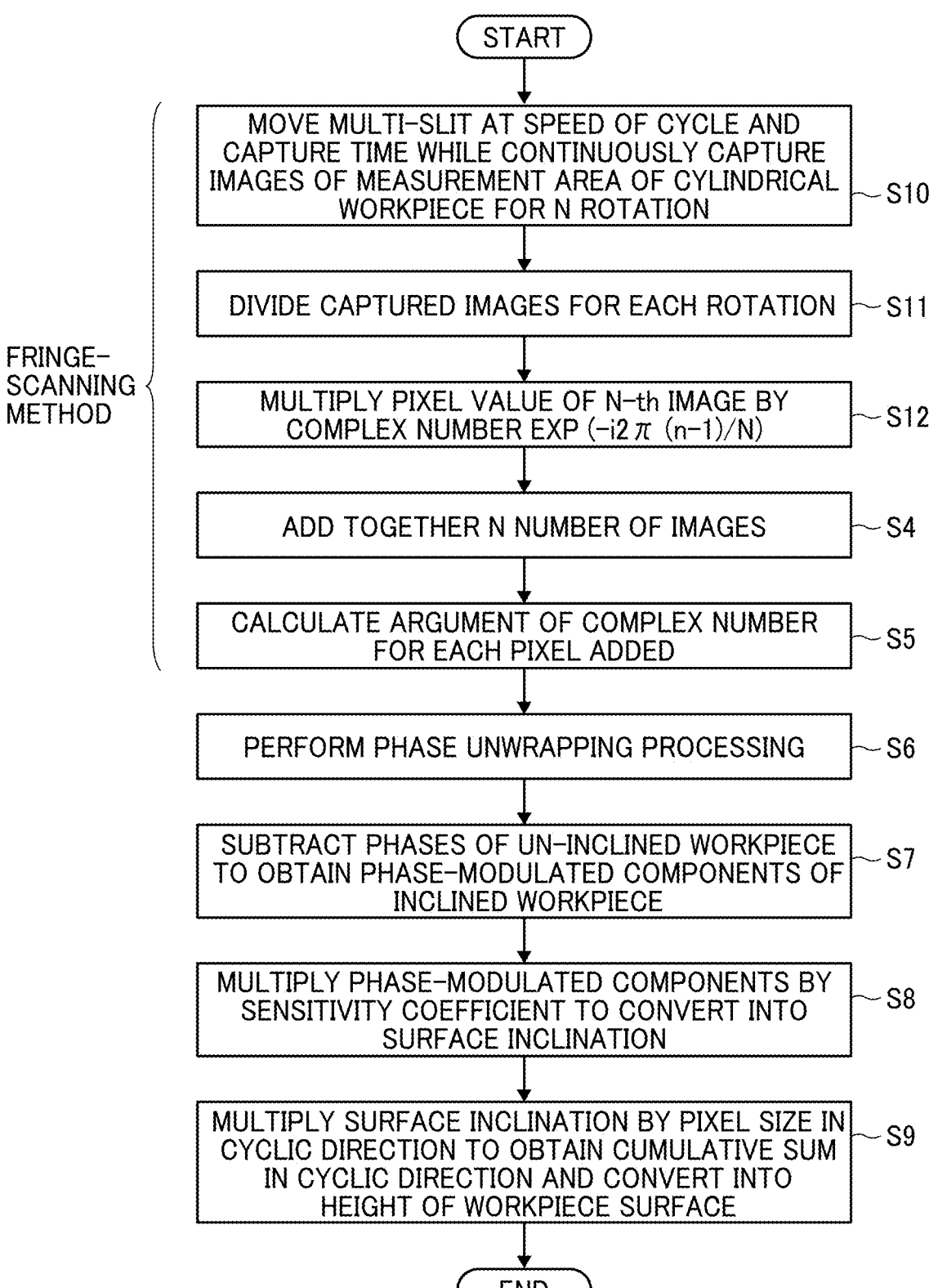
FIG. 8 is a flowchart illustrating control in which the shape-data acquisition apparatus of FIGS. 7A and 7B obtains shape data of a work surface of a workpiece, according to an embodiment of the present disclosure.

FIG. 8 is a flowchart illustrating control in which the shape-data acquisition apparatus 1 of FIGS. 7A and 7B obtains the shape data of the workpiece 10 having the columnar or cylindrical shape.

As illustrated in FIG. 8, unlike the control described with reference to FIG. 4, first, the multi-slit 7 or the illumination multi-slit 14 is moved at a speed at which images are captured for the cycle divided by the N number of rotations of the workpiece 10 while images of the workpiece 10 having the cylindrical or cylindrical shape are continuously captured for the N number of rotations (step S10). Then, the captured images of the workpiece 10 are divided for each rotation (step S11), and the pixel value of the n-th captured image is multiplied by the complex number exp $(-i2\pi(n-1)/N)$ (step S12). Subsequently, a procedure similar to steps S4, S5, S6, S7, S8, and S9 in the control procedure of FIG. 4 is performed. As described above, in the fourth embodiment, the fringe-scanning method can be performed by continuously scanning the multi-slit 7 or the illumination multi-slit 14 for one cycle. Accordingly, capturing images of the workpiece 10 for the fringe-scanning method can be performed in a short time.

As described above, the shape-data acquisition apparatus 1 according to the fourth embodiment obtains the shape data of the work surface 10a of the workpiece 10, and includes the illuminator 12 having the luminance distribution of the cycle f1 in the predetermined cyclic direction to irradiate the work surface 10a with illumination light at the predetermined incident angle θ. In addition, the shape-data acquisition apparatus 1 according to the fourth embodiment includes the multi-slit 7 as the transmissive optical element facing the specular reflected light of the illumination light reflected by the work surface 10a and having the transmittance distribution of the cycle f2 in the predetermined cyclic direction. Further, the shape-data acquisition apparatus 1 according to the fourth embodiment includes the line-sensor camera 5 and the lens 4 as the imager to capture the image of the work surface 10a. The line-sensor camera 5 and the lens 4 are disposed so as to receive the specular reflected light transmitted through the multi-slit 7. The cyclic direction of the cycle f1 and the cyclic direction of the cycle f2 folded at the mirror image position with respect to the work surface 10a are parallel to each other. Further, when the distance between the illumination multi-slit 14 as the second transmissive optical element of the illuminator 12 and the work surface 10a in the optical-axis direction is a and the distance between the work surface 10a and the multi-slit 7 in the optical-axis direction is b, the Formula 1 of b=a×f2/f1 is satisfied.

Accordingly, even if the workpiece 10 is a transparent object, the shape data of the work surface 10a can be obtained at high speed, high sensitivity, and high resolution. Thus, a measurable area on the work surface 10a can be widened. In other words, even if the workpiece 10 is a transparent object, the shape data of the work surface 10a can be obtained efficiently and accurately.

Aspects of the present disclosure are as follows, for example.

First Aspect

A shape-data acquisition apparatus according to a first aspect of the present disclosure obtains shape data of a work surface of an object to be inspected. The shape-data acqui-
sition apparatus includes an illuminator, a transmissive
optical element, and an imager. The illuminator has a
luminance distribution of a first cycle in a predetermined
cyclic direction and irradiates the work surface with illumi-
nation light at a predetermined incident angle to the work
surface. The transmissive optical element faces specular
reflected light of the illumination light reflected by the work
surface and has a transmittance distribution of a second
cycle in a predetermined cyclic direction. The imager is
disposed at a position to receive the specular reflected light
transmitted through the transmissive optical element to
capture the work surface. The cyclic direction of the first
cycle of the illuminator and the cyclic direction of the
second cycle of the transmissive optical element folded at a
mirror image position on the work surface are parallel to
each other. A relation of $b=a \times f2/f1$ is satisfied, when a is a
distance between the illuminator and the work surface in an
optical-axis direction, and b is a distance between the work
surface and the transmissive optical element in the optical-
axis direction, f1 is the first cycle of the illuminator, and f2
is the second cycle of the transmissive optical element Second Aspect In the shape-data acquisition apparatus according to a
second aspect of the present disclosure, the illuminator
includes an illumination having a uniform luminance distri-
bution and a second transmissive optical element. The
second transmissive optical element has the transmittance
distribution of the first cycle in the cyclic direction and is
disposed at a position between the illumination and the work
surface such that a distance between the second transmissive
optical element and the work surface in the optical-axis
direction is equal to the distance between the illuminator and
the work surface in the optical-axis direction. The illumi-
nator has the luminance distribution of the first cycle in the
cyclic direction Third Aspect In a third aspect of the present disclosure, the shape-data
acquisition apparatus according to the first aspect or the
second aspect further includes a scanner and an image
processor. The scanner scans at least one of the luminance
distribution of the first cycle of the illuminator and the
transmittance distribution of the second cycle of the trans-
missive optical element in the cyclic direction. The image
processor performs arithmetic processing of images of the
work surface captured by the imager and calculates at least
one of a surface inclination and a surface height of the work
surface.

Fourth Aspect

In a fourth aspect of the present disclosure, in the shape-
data acquisition apparatus according to the third aspect, the
image processor obtains the shape of the work surface from
a factor of proportionality between a phase modulation
amount obtained based on a result of arithmetic processing
by the image processor when scanning is performed by the
scanner and a surface inclination of the work surface.

Fifth Aspect

In a fifth aspect of the present disclosure, the scanner is a
scanning mechanism to scan the transmissive optical ele-
ment in the cyclic direction of the second cycle.

Sixth Aspect

In a sixth aspect of the present disclosure, in the shape-
data acquisition apparatus according to any one of the third
aspect to the fifth aspect, each of the cyclic direction of the
first cycle of the illuminator and the cyclic direction of the second cycle of the transmissive optical element is orthogo-
nal to an incident plane of the illumination light on the work
surface.

Seventh Aspect

In a seventh aspect of the present disclosure, the shape-
data acquisition apparatus according to any one of the third
aspect to the sixth aspect further includes a rotation mecha-
nism to rotate the object having a cylindrical or a columnar
shape about a central axis of the object. The work surface of
the object is continuously captured by the imager while the
scanner performs scanning at a constant speed during rota-
tion of the object by the rotation mechanism.

Eighth Aspect

In an eighth aspect of the present disclosure, in the
shape-data acquisition apparatus according to any one of the
aspects 1 to 7, at least one of the luminance distribution of
the illuminator and the transmittance distribution of the
transmissive optical element has a sine wave shape.

Note that the present disclosure is not limited to the
above-described embodiments, and it is apparent that the
above-described embodiments can be appropriately modi-
fied within the scope of the technical idea of the present
disclosure other than those suggested in the embodiments. In
addition, number, position, shape of the above-described
components are not limited to those in the above-described
embodiments. However, the number, the position, the shape
of the above-described components may be any number,
position, shape suitable for implementing the present dis-
closure.

Note that in this specification, a predetermined incident
angle is defined as an incident angle greater than or equal to
0° excluding 0°.

The above-described embodiments are illustrative and do
not limit the present disclosure. Thus, numerous additional
modifications and variations are possible in light of the
above teachings. For example, elements and/or features of
different illustrative embodiments may be combined with
each other and/or substituted for each other within the scope
of the present disclosure.

The invention claimed is:

1. A shape-data acquisition apparatus for obtaining shape
data of a work surface of an object to be inspected, the
shape-data acquisition apparatus comprising:

an illuminator including light-emitting portions and non-
light-emitting portions alternately arranged at equal
widths along a first direction, wherein a distance
between each light-emitting portion is f1, and the
light-emitting portions irradiate the work surface with
illumination light at an incident angle to the work
surface;

a transmissive optical element facing specular reflected
light of the illumination light reflected by the work
surface, the transmissive optical element including
opening portions and non-opening portions alternately
arranged at equal widths along a second direction,
wherein the opening portions transmit the specular
reflected light, and a distance between each opening
portion is f2; and an imager at a position to receive the specular reflected
light transmitted through the transmissive optical ele-
ment to capture the work surface, wherein the first direction and the second direction, when folded at
a mirror image position on the work surface, are
parallel to each other, and a relation of $b=a \times f2/f1$ is satisfied, where a is a distance
between the illuminator and the work surface in an optical-axis direction, and b is a distance between the work surface and the transmissive optical element in the optical-axis direction.

2. The shape-data acquisition apparatus according to claim 1, wherein the illuminator includes a second transmissive optical element, the second transmissive optical element includes the light-emitting portions and the non-light-emitting portions, and the second transmissive optical element is located at a position between an illumination source and the work surface such that a distance between the second transmissive optical element and the work surface in the optical-axis direction is equal to the distance between the illuminator and the work surface in the optical-axis direction.

3. The shape-data acquisition apparatus according to claim 1, further comprising:

a scanner to scan at least one of f1 and f2; and an image processor configured to:

perform arithmetic processing on an image of the work surface captured by the imager; and calculate at least one of a surface inclination or a surface height of the work surface.

4. The shape-data acquisition apparatus according to claim 3, wherein the image processor is further configured to obtain the shape data of the work surface from a factor of proportionality between a phase modulation amount obtained based on a result of the arithmetic processing by the image processor when scanning is performed by the scanner and a surface inclination of the work surface.

5. The shape-data acquisition apparatus according to claim 3, wherein the scanner is a scanning mechanism to scan the transmissive optical element in the second direction.

6. The shape-data acquisition apparatus according to claim 3, wherein each of the first direction and the second direction is orthogonal to an incident plane of the illumination light on the work surface.

7. The shape-data acquisition apparatus according to claim 3, further comprising:

a rotation mechanism to rotate the object having a cylindrical or columnar shape about a central axis of the object, wherein the work surface of the object is continuously captured by the imager while the scanner performs scanning at a constant speed during rotation of the object by the rotation mechanism.

8. The shape-data acquisition apparatus according to claim 1, wherein at least one of a luminance distribution of the illuminator or a transmittance distribution of the transmissive optical element has a sine wave shape.

9. A shape-data acquisition apparatus for obtaining shape data of a work surface of an object to be inspected, the shape-data acquisition apparatus comprising:

an illuminator including light-emitting portions and non-light-emitting portions alternately arranged along a first direction, wherein the light-emitting portions irradiate the work surface with illumination light at an incident angle to the work surface;

a transmissive optical element facing specular reflected light of the illumination light reflected by the work surface, the transmissive optical element including opening portions transmitting the specular reflected light and non-opening portions not transmitting the specular reflected light alternately arranged along a second direction; and an imager at a position to receive the specular reflected light transmitted through the transmissive optical element to capture the work surface, wherein the first direction and the second direction, when folded at a mirror image position on the work surface, are parallel to each other, and a relation of $b = a \times f2/f1$ is satisfied, where a is a distance between the illuminator and the work surface in an optical-axis direction, b is a distance between the work surface and the transmissive optical element in the optical-axis direction, f1 is a distance between each light-emitting portion, and f2 is a distance between each opening portion.

10. The shape-data acquisition apparatus according to claim 9, wherein the illuminator has a uniform luminance distribution and includes a slit, and the slit configures the light-emitting portions and the non-light-emitting portions.

11. The shape-data acquisition apparatus according to claim 9, wherein at least one of a luminance distribution of the illuminator or a transmittance distribution of the transmissive optical element has a sine wave shape.

12. The shape-data acquisition apparatus according to claim 9, wherein a width of the illuminator in the first direction is larger than a width of the transmissive optical element in the second direction.

13. The shape-data acquisition apparatus according to claim 9, wherein the illuminator includes a second transmissive optical element, the second transmissive optical element includes the light-emitting portions and the non- light-emitting portions, and the second transmissive optical element is located at a position between an illumination source and the work surface such that a distance between the second transmissive optical element and the work surface in the optical-axis direction is equal to the distance between the illuminator and the work surface in the optical-axis direction.

14. The shape-data acquisition apparatus according to claim 9, further comprising:

a scanner to scan at least one of f1 and f2; and an image processor configured to:

perform arithmetic processing on an image of the work surface captured by the imager; and calculate at least one of a surface inclination or a surface height of the work surface.

15. The shape-data acquisition apparatus according to claim 14, wherein the image processor is further configured to obtain the shape data of the work surface from a factor of proportionality between a phase modulation amount obtained based on a result of the arithmetic processing by the image processor when scanning is performed by the scanner and a surface inclination of the work surface.

16. The shape-data acquisition apparatus according to claim 14, wherein the scanner is a scanning mechanism to scan the transmissive optical element in the second direction.

17. The shape-data acquisition apparatus according to claim 14, wherein each of the first direction and the second direction is orthogonal to an incident plane of the illumination light on the work surface.

18. The shape-data acquisition apparatus according to claim 14, further comprising:

a rotation mechanism to rotate the object having a cylindrical or columnar shape about a central axis of the object, wherein the work surface of the object is continuously captured by the imager while the scanner performs scanning at a constant speed during rotation of the object by the rotation mechanism.

\* \* \* \* \*